UNITED STATES PATENT OFFICE.

ISAIAH PLETCHER, OF IUKA, ILLINOIS.

DRY-CELL BATTERY.

1,283,292.

Specification of Letters Patent.

Patented Oct. 29, 1918.

No Drawing.

Application filed March 13, 1918. Serial No. 222,129.

*To all whom it may concern:*

Be it known that I, ISAIAH PLETCHER, a citizen of the United States, residing at Iuka, in the county of Marion and State of Illinois, have invented certain new and useful Improvements in Dry-Cell Batteries, of which the following is a specification.

The present invention relates to an improved impregnating solution, or liquid chemical composition, especially adapted and intended for re-charging dry cell batteries, and particularly such batteries of the type as are used in telephone circuits.

I have herein disclosed one complete example of the physical embodiment of my invention, prepared according to the best formula I have so far discovered for the practical application of the principles of the invention, and this formula has proven highly successful and efficient in actual tests and practical use.

The formula for preparing the solution is as follows:

Acid vinegar, one quart;
Acetic acid, two ounces;
Salicylic acid, one ounce;
Carbolic acid (crude), one-half ounce.

In mixing the solution, in approximately the above proportions, the acid vinegar is prepared in a suitable receptacle and then the other ingredients are successively added thereto, in proper proportions, the ingredients, of course being thoroughly stirred and mixed together as they are successively added, the result being a clear, comparatively thin, solution, extremely suitable for the purpose for which it is intended.

In the process of re-charging batteries or dry cells with the solution, the elements of the battery are first punctured or perforated at a sufficient number of places, by a tool, such as an awl or other similar instrument, the puncture or perforation preferably being from the outside of the battery to the center of the carbon.

After the carbon has been properly perforated it is placed in a suitable vessel, and then the solution is poured into the vessel until the carbon element is nearly submerged. The carbon is permitted to remain in the solution for a suitable period of time, say three or four hours for the usual size battery cell as employed on telephone circuits, and in this time the solution permeates the carbon, through the perforations or passages prepared for it in the carbon, the passages acting as channels for introduction of the solution to the interior of the carbon, and from thence the solution permeates in all directions, thus effectively impregnating practically all parts of the carbon to the capacity of the absorbing qualities of the carbon.

After a suitable time has elapsed, the carbon or element of the battery is removed from the solution, thoroughly and carefully dried, and then the perforations or passages in the carbon are plugged with suitable material, as wax, or putty, to seal the openings, and the impregnated carbons are ready for use. After the carbons have been exhausted, they can be again impregnated with the solution and are ready for use.

What I claim is:—

An impregnating solution as described comprising in suitable proportions: Acid vinegar, acetic acid, salicylic acid, carbolic acid.

Dated this 9th day of March, 1918, Iuka, Marion county, Illinois.

ISAIAH PLETCHER.